Aug. 24, 1926.

B. JORGENSEN 1,596,930

END LASTING MECHANISM

Filed Feb. 20, 1922          2 Sheets-Sheet 1

INVENTOR
Bernhardt Jorgensen
By his Attorney
Nelson W. Howard

Aug. 24, 1926.

B. JORGENSEN 1,596,930

END LASTING MECHANISM

Filed Feb. 20, 1922     2 Sheets-Sheet 2

Patented Aug. 24, 1926.

1,596,930

UNITED STATES PATENT OFFICE.

BERNHARDT JORGENSEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

END-LASTING MECHANISM.

Application filed February 20, 1922. Serial No. 537,993.

This invention relates to shoe end lasting mechanism, and is herein illustrated in its application to toe wiper mechanism adapted for use in combined pulling-over and toe lasting machines of the type illustrated in United States Letters Patent No. 1,280,613 granted on Oct. 1, 1918, upon an application of Orrell Ashton. It will be recognized, however, that the invention, in many of its novel aspects, is not limited in utility to pulling-over and lasting machines nor to mechanism of the types commonly used for lasting the toes of shoes.

In end lasting wiper mechanism it has been necessary heretofore to substitute different wipers where there are substantial differences in width or edge contour between different sizes or styles of shoes, since wipers that are adapted, for example, for lasting one width of toe are not satisfactorily conformable to a toe of materially different width. In the use, therefore, of lasting machinery, including the type of pulling-over and lasting machine shown in said prior patent, it has been necessary for shoe manufacturers to have on hand many different sets of wipers, thus adding materially to the cost of machine equipment.

It is an object of the present invention to reduce the expense of machine equipment and to eliminate the delay involved in substituting different wipers. To this and other ends, a feature of the invention consists in a novel construction of wiper mechanism which is readily adjustable to adapt it for use on different shoes, the construction shown comprising wiper members which are mounted for operative swinging movements and are relatively adjustable bodily toward and from each other for different widths of toes. In its application to the type of wiper mechanism shown in said prior patent, comprising wipers the opposite side portions of which are each made up of a plurality of wiper sections operated by members which are moved inwardly toward the sides of the shoe, the invention provides for relative bodily adjustment laterally of the shoe between the wiper sections at one side of the mechanism and those at the other side of the mechanism, the construction shown having a single adjusting member for moving the opposite side portions of the wipers toward or from each other.

The above and other features of the invention, including various details of construction and combinations of parts, will now be more particularly described with reference to the accompanying drawings and pointed out in the claims.

Figure 1:
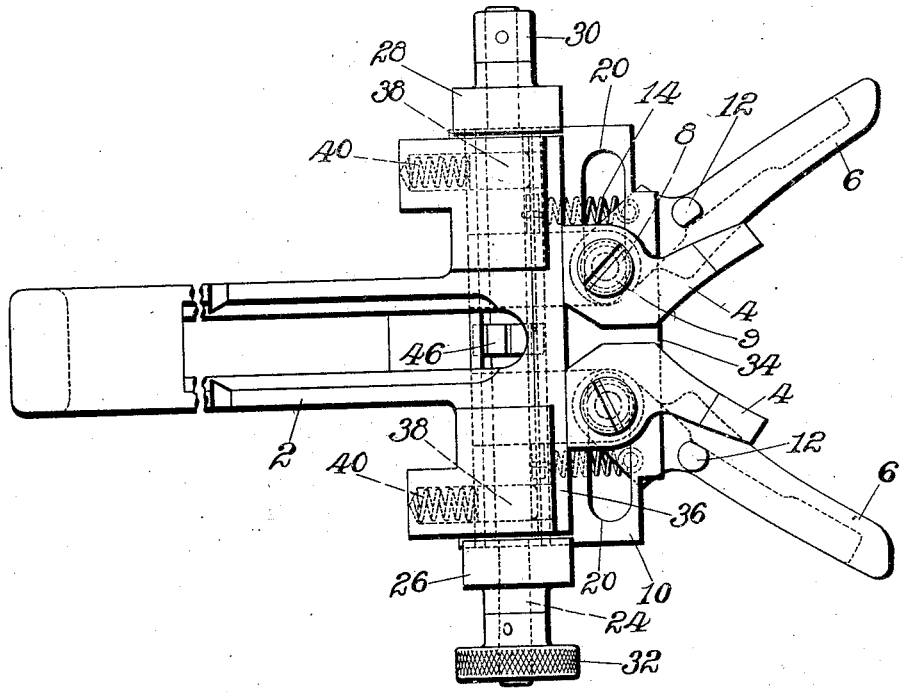
Fig. 1 is a plan view of wiper mechanism embodying the features of the invention, showing the mechanism detached from the machine in which it is adapted to be used.
Figure 2:
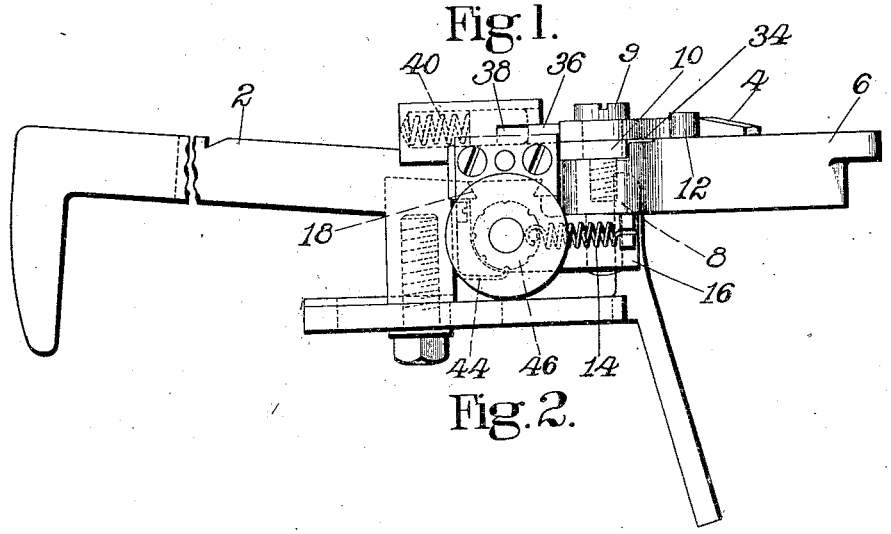
Fig. 2 is a side elevation of the wiper mechanism shown in Fig. 1.

For use in a machine of the type illustrated in said prior patent the wiper mechanism herein shown comprises a wiper support or holder 2 adapted for attachment in the usual manner to the front arm of the machine and upon which the toe wipers are mounted. For operating upon the upper materials at each side of the toe the wipers comprise a plurality of wiper members or sections 4 and 6, the member 4 engaging the upper at the side of the toe near its end and the member 6 wiping inwardly under a portion of the member 4 and extending farther rearwardly along the side of the shoe to act substantially as an extension of the member 4. In the construction shown the wiper members or sections 4 and 6 at each side of the mechanism are mounted to swing laterally of the shoe about a common axis represented by a pivot pin 8 on which the member 6 is mounted and a screw 9 which enters the pin 8 and acts as a pivot for the member 4 as well as to hold the member 4 in place. At their inner ends the members 6 are recessed, as shown in Fig. 2, to receive a forwardly projecting plate 10 which supports the members 4 with their wiping edges in approximately the same plane as the wiping edges of the members 6. Each member 6 is engaged and closed inwardly by an operating member 11 (Figs. 3 and 4) on the corresponding side arm of the pulling over machine and has thereon a pin 12 which engages the member 4 to close the latter also inwardly over the shoe, the members 6 being further shaped for engagement with the sides of the shoe to limit their closing movements. Each of the members 6 is held normally in its open position by means of a spring 14 which is connected to said member and to the wiper holder 2, the limit of opening movement being determined by engagement of the member 6 with the plate 10. For maintaining the members 4 normally in open position means are provided which will be more particularly described hereinafter.

For purposes of the present invention the members 4 and 6 at each side of the wiper mechanism are adjustable together bodily widthwise of the shoe toe toward and from the members at the other side of the mechanism. To this end the pivot pins 8 and their screws 9 are carried by supporting blocks 16 which have dovetailed engagement with a guideway 18 extending transversely across the wiper holder 2 and are movable along said guideway in directions substantially perpendicular to the longitudinal median line of the shoe, the movement of the screws 9 and the pins 8 being permitted by the provision of slots 20 in the plate 10. For adjusting the blocks along the guideway 18 a screw 24 is provided having right and left hand threaded portions engaging the respective blocks, the screw being held against lengthwise movement by means of members 26 and 28 on the wiper holder which afford bearings for the screw, the latter having fast on its outer end a collar 30 and on its opposite end a knurled head 32 for use in turning it. By turning the screw 24 in one direction the blocks 16 and the wiper sections 4 and 6 at the opposite sides of the mechanism are adjusted simultaneously toward each other, and by turning the screw in the opposite direction the sections are adjusted away from each other.

Figure 3:
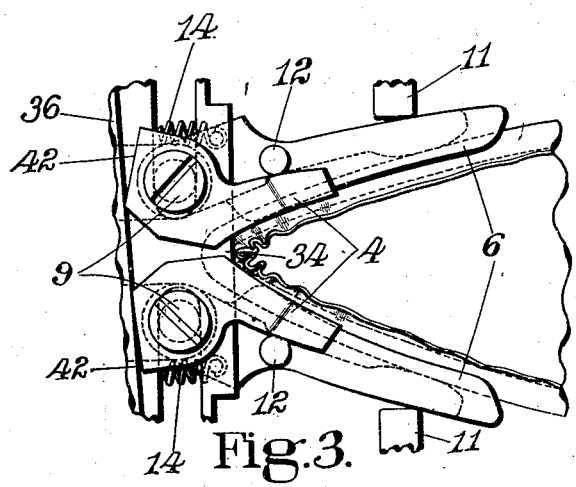
Fig. 3 is a plan view of a portion of the mechanism of Fig. 1 with the wipers adjusted for use upon a comparatively narrow pointed toe and showing the wipers in their closed position in relation to a shoe.
Figure 4:
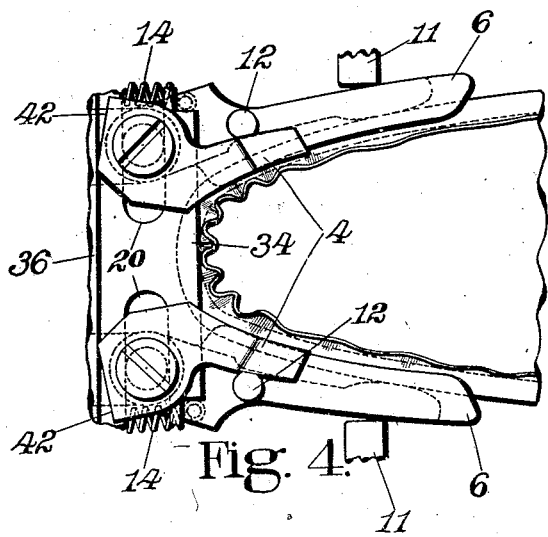
Fig. 4 is a view similar to Fig. 3 showing the wipers as adjusted for use upon a shoe of different shape from that illustrated in Fig. 3.

In the construction shown a single wiper member is provided for wiping the upper inwardly at the extreme end of the toe in all positions of adjustment of the members 4 and 6, this end wiper member comprising a thin edge extension 34 (Fig. 2) of the plate 10 lying in a recess in the members 6 in the same plane as the wiping edges of the latter. The member 34 thus presents a wiping edge extending across the space between the members 4 in all positions of adjustment of the wipers, as illustrated in Figs. 3 and 4. In the construction herein shown for turn shoe work the member 34 has a straight wiping edge, although the edge may be differently shaped if desired.

The wiper members 4 in the construction herein shown are further controlled by a plate 36 which is slidingly mounted in the holder 2 and is pressed forward toward the wipers by plungers 38 under the action of springs 40. The plate 36 is arranged to bear on straight shoulders 42 on the wiper members 4 to maintain these members in open position, and is pressed back by the turning of these wiper members in the closing of the wipers, as illustrated in Figs. 3 and 4, the plate being permitted to swing if one wiper is moved farther than the other in closing. Subsequently the plate 36 acts to return the members 4 to open position at the time when the members 6 are swung outwardly by their springs 14, the plate 36 being operative in all positions of adjustment of the wipers.

In order to assist in maintaining the wipers in adjusted position a resilient catch 44 is mounted on the wiper holder in position to engage notches in the periphery of a member 46 which is fast on the adjusting screw 24, the catch 44 being yieldable in response to the turning of the screw when wiper adjustment is desired, but effective to lock the screw from turning in response to accidental contact therewith.

Having described the invention, what I claim as new and desire to secure by Letters Patent of the United States is:

1. In end lasting mechanism, the combination with a wiper support, of wipers mounted on said support for closing movements at the opposite sides of an end of a shoe each about an axis substantially perpendicular to the plane of the shoe bottom, said wipers being relatively adjustable bodily in directions widthwise of the shoe and substantially perpendicular to the longitudinal median line of the shoe.

2. In end lasting mechanism, the combination with a wiper support, of wipers on said support arranged to operate respectively at the opposite sides of an end of a shoe by swinging movement each about an axis substantially perpendicular to the plane of the shoe bottom, and mechanism connected to said wipers for adjusting them bodily toward or from each other in directions widthwise of the shoe and substantially perpendicular to the longitudinal median line of the shoe.

3. In end lasting mechanism, the combination with a wiper support, of wipers on said support arranged to operate respectively at the opposite sides of an end of a shoe, means for operating said wipers, said wipers being mounted for bodily adjustment widthwise of the shoe, and adjusting mechanism comprising a screw with right and left hand threaded portions connected respectively to the different wipers for adjusting them simultaneously in opposite directions independently of their operating means.

4. In end lasting mechanism, the combination with a wiper support, of wipers on said support arranged to operate respectively at the opposite sides of an end of a shoe and mounted for inward swinging movements independently of each other in response to pressure applied at the sides of the shoe, and mechanism for effecting a relative bodily adjustment of said wipers widthwise of the shoe.

5. In end lasting mechanism, the combination with a wiper support, of wipers on said support arranged to operate respectively at the opposite sides of an end of a shoe, and members on which said wipers are respectively pivoted for swinging movements laterally of the shoe, said members being mounted on the wiper support for adjusting movements widthwise of the shoe.

6. In end lasting mechanism, the combination with a wiper support, of wipers on said support arranged to operate respectively at opposite sides of an end of a shoe, members on which said wipers are respectively pivoted for swinging movements laterally of the shoe, the wiper support having a guideway along which said members are movable, and adjusting mechanism connected to said members for moving them along said guideway.

7. In end lasting mechanism, the combination with a wiper support, of wipers on said support arranged to operate respectively at opposite sides of an end of a shoe, said wipers being pivoted for swinging movements laterally of the shoe, and means for effecting a right line adjustment of said wipers toward or from each other widthwise of the shoe.

8. In end lasting mechanism, the combination with a wiper support, of wipers on said support arranged to operate respectively at the opposite sides of an end of a shoe, mechanism for adjusting said wipers bodily toward or from each other widthwise of the shoe, and means for locking said wipers in adjusted position.

9. In end lasting mechanism, the combination with a wiper support, of wipers on said support arranged to operate respectively at the opposite sides of an end of a shoe, said wipers being relatively adjustable bodily in directions widthwise of the shoe, and an end wiper arranged to operate at the end of the shoe between said first named wipers in all positions of relative adjustment of said wipers.

10. In end lasting mechanism, the combination with a wiper support, of wipers on said support arranged to operate respectively at the opposite sides of an end of a shoe and mounted for swinging movements laterally of the shoe, an end wiper arranged to operate at the end of the shoe between said side wipers, and means for relatively adjusting said side wipers bodily widthwise of the shoe along the wiping edge of said end wiper.

11. In end lasting mechanism, the combination with a wiper support, of a wiper on said support arranged to operate at an end of a shoe, additional wipers arranged to operate at the opposite sides of the end of the shoe, and means for adjusting said additional wipers toward or from each other along said end wiper independently of movement of the end wiper to expose different lengths of the wiping edge of said end wiper.

12. In end lasting mechanism, the combination with a wiper support, of wipers on said support comprising a plurality of relatively movable wiper sections for each side of an end of a shoe, and means for effecting a relative bodily adjustment widthwise of the shoe between the wiper sections at one side of the shoe and the wiper sections at the other side of the shoe.

13. In end lasting mechanism, the combination with a wiper support, of end lasting wipers on said support comprising a pair of relatively movable wiper sections for each side of an end of a shoe, members on which the different respective pairs of wiper sections are pivoted for swinging movements laterally of the shoe, and means for adjusting said members toward or from each other in directions widthwise of the shoe to adjust the wipers for different shoes.

14. In end lasting mechanism, the combination with a wiper support, of wipers on said support arranged to operate respectively at the opposite sides of an end of a shoe, said wipers being mounted for swinging movements laterally of the shoe, and a spring controlled member arranged to bear against said wipers to oppose yielding resistance to their inward swinging movements and to return them to starting position after operating upon a shoe.

15. In end lasting mechanism, the combination with a wiper support, of wipers on said support arranged to operate respectively at the opposite sides of an end of a shoe and mounted for inward swinging movements independently of each other in response to pressure applied at the sides of the shoe, and a spring controlled member arranged to be forced back by the inward movements of said wipers and to return them subsequently to starting position, said member being mounted to swing in accordance with differences in the extent of the inward movements of the respective wipers.

16. In end lasting mechanism, the combination with a wiper support, of wipers on said support arranged to operate respectively at the opposite sides of an end of a shoe, said wipers being mounted for swinging movements laterally of the shoe and also for bodily adjusting movements widthwise of the shoe, and a spring controlled member arranged to be forced back by the inward movements of said wipers in all positions of their adjustment and to return them to open position after they have operated upon a shoe.

In testimony whereof I have signed my name to this specification.

BERNHARDT JORGENSEN.

Certificate of Correction.

It is hereby certified that in Letters Patent No. 1,596,930, granted August 24, 1926, upon the application of Bernhardt Jorgensen, of Beverly, Massachusetts, for an improvement in " End-Lasting Mechanism," an error appears in the printed specification requiring correction as follows: Page 1, lines 12 and 13, strike out the words " of the types commonly used " and insert the same to follow after the word " mechanism ", line 14; and that the said Letters Patent should be read with this correction therein that the same may conform to the record of the case in the Patent Office.

Signed and sealed this 21st day of December, A. D. 1926.

[SEAL.]

M. J. MOORE,
*Acting Commissioner of Patents.*